United States Patent [19]

Asai

[11] Patent Number: 5,169,682

[45] Date of Patent: Dec. 8, 1992

[54] METHOD OF PROVIDING SILVER ON CALCIUM CARBONATE MATERIAL SUCH AS CORAL SAND

[75] Inventor: Soichi Asai, Tokyo, Japan

[73] Assignee: Coral Biotech Co., Ltd., Naha, Japan

[21] Appl. No.: 672,333

[22] Filed: Mar. 20, 1991

[30] Foreign Application Priority Data

Mar. 28, 1990 [JP] Japan ................. 2-79529
Mar. 28, 1990 [JP] Japan ................. 2-79530

[51] Int. Cl.$^5$ ............................................ B05D 7/24
[52] U.S. Cl. .................................. 427/217; 427/343; 427/383.3; 427/443.1; 427/443.2; 75/636
[58] Field of Search ............. 427/217, 343, 383.3, 427/443.1, 443.2; 75/636, 733; 428/403; 210/501

[56] References Cited

U.S. PATENT DOCUMENTS

| | | | |
|---|---|---|---|
| 3,929,466 | 12/1975 | Moynahan et al. | 75/636 |
| 4,045,553 | 8/1977 | Mitsumori et al. | 210/501 |
| 4,078,918 | 3/1978 | Perman | 75/721 |
| 4,201,875 | 5/1980 | Wu et al. | 568/575 |
| 4,407,865 | 10/1983 | Nice | 210/501 |
| 4,463,031 | 7/1984 | Someya | 210/501 |
| 4,652,465 | 3/1987 | Koto et al. | 427/217 |
| 5,045,349 | 9/1991 | Ferrando | 427/217 |

FOREIGN PATENT DOCUMENTS

| | | | |
|---|---|---|---|
| 49-4707 | 1/1974 | Japan | 427/217 |
| 51-90996 | 8/1976 | Japan | 210/501 |
| 57-179107 | 11/1982 | Japan | 427/217 |
| 60-33403 | 8/1985 | Japan . | |
| 60-183086 | 9/1985 | Japan | 427/217 |
| 61-190335 | 8/1986 | Japan | 427/217 |
| 63-34228 | 7/1988 | Japan . | |

*Primary Examiner*—Shrive Beck
*Assistant Examiner*—Terry J. Owens
*Attorney, Agent, or Firm*—Spencer, Frank & Schneider

[57] ABSTRACT

A method of providing silver on a calcium carbonate material having fine pores, such as coral sand, oyster shells, and crab shells, including (a) contacting a calcium carbonate material with an aqueous solution of silver nitrate for a time effective for the silver nitrate to react with the calcium carbonate to form silver carbonate on the surface of the calcium carbonate material; (b) dewatering the calcium carbonate material after step (a); and (c) treating the calcium carbonate material after step (b) in an aqueous solution containing from 5 to 15 weight % of a reducing agent selected from the group consisting of ascorbic acid, a derivative of ascorbic acid, erythrobic acid, and a derivative of erythrobic acid to reduce the silver carbonate on the surface of the calcium carbonate to silver. Preferably contacting is by injection of an upward stream of the aqueous solution of silver nitrate through a layer of the calcium carbonate material. Instead of or in addition to employing a reducing agent, the silver carbonate may be reduced directly by uniformly heating the calcium carbonate material after step (b) at a temperature of at least 200° C., and preferably at a temperature ranging from 300° to 400° C.

24 Claims, No Drawings

METHOD OF PROVIDING SILVER ON CALCIUM CARBONATE MATERIAL SUCH AS CORAL SAND

BACKGROUND OF THE INVENTION

1. Field of the Invention

This invention relates to an improved method of adding silver to the surface of coral sand which contains calcium carbonate and which is useful for sterilizing water. Coral sand has been attracting attention as a purifying agent for water in recent years.

2. Background of the Art

Coral sand is a porous material having an extremely large specific surface area, but is different from general calcium carbonate.

As a purifying agent for water, it is known to add silver to the surfaces of base agents, such as activated carbon, coral sand, and the like, and to install same into a water purifier for use.

As a method of adding silver to these base agents, a method using the so-called silver mirror reaction is known. Aqueous ammonia is added to a silver nitrate solution to form diamine argenate, coral sand is dipped therein, and then a reducing solution, such as formalin, glucose, and the like, is added to deposit silver on the coral sand (Japanese Patent Publication No. 60-33403).

As another method, it is known to add silver nitrate to coral sand to cover its surface with silver carbonate, to pour a hydrogen peroxide solution thereon to reduce the silver carbonate to silver, and to thereby obtain coral sand having silver adhered on the surface (Japanese Patent Publication No. 63-34228).

However, these prior art methods have the following drawbacks.

In the method employing the silver mirror reaction, a complicated operation is required to provide addition amounts of various reagents and temperature conditions to cause the reduction reaction. Because the reduced silver adheres not only to the coral sand but also to the vessel, impregnation efficiency of silver is poor.

Further, ammonia, which is used as the added reagent, smells bad even if it only remains in small quantities, and it is not suitable for use in a method of adding silver to a purifying agent.

In the case where silver carbonate is reduced by hydrogen peroxide solution to silver after formation of silver carbonate with silver nitrate, there is no bad smell because ammonium is not employed, but the hydrogen peroxide solution is a material used also as a bleaching agent and is known to have a bad effect on animals. Thus, it has some problems when used as an additive (reducing agent) for a purifying agent for drinking water.

SUMMARY OF THE INVENTION

Therefore, one object of this invention is to provide a method of providing silver on the surface of a calcium carbonate which enables use thereof as a purifying agent for drinking water and is highly safe even if additives remain, in consideration of the disadvantages of the prior art.

Another object of this invention is to provide a method of effectively and easily providing silver on a calcium carbonate, such as coral sand.

The present invention provides a first method of providing silver on a calcium carbonate, comprising:

(a) dipping a calcium carbonate having fine pores, such as coral sand, in a silver nitrate solution for a long time to form silver carbonate on the surface of the calcium carbonate, and (b) dipping the washed and dewatered calcium carbonate in a 5-15 wt. % solution of a reducing agent selected from the group consisting of ascorbic acid, erythorbic acid, and derivatives thereof to reduce the silver carbonate to silver.

The present invention provides a second method of providing silver on a calcium carbonate, comprising:

(a) dipping a dried calcium carbonate, such as coral sand, in a vessel containing a silver nitrate solution for a long time to form silver carbonate on the surface of the calcium carbonate, and also bringing the calcium carbonate into sufficient contact with the silver nitrate solution while deaerating, and (b) removing the calcium carbonate from the silver nitrate solution followed by dewatering, and directly reducing the silver carbonate to silver oxide and then to silver while uniformly heating the calcium carbonate at a temperature of 200° C. or more in an air or nitrogen current. The heating temperature for reduction preferably ranges from 300° C. to 400° C.

In step (a) of each method, the calcium carbonate is preferably dipped in the silver nitrate solution while stirring and shielding from light for about 1 to 5 days.

As the derivatives of ascorbic acid and the like to be used as the reducing agent in step (b) of the first method, sodium ascorbate and sodium erythorbate are preferred.

As coral sand is generally porous, there is a possibility that air is contained in the pores, and a sufficient deposition of silver can not be realized if the air remains.

Thus, in step (a) of the first and second methods the air in the fine pores of the calcium carbonate is preferably removed by injecting the silver nitrate solution as an upward stream through the bottom part of the layer of calcium carbonate. As the calcium carbonate having fine pores, coral sand is preferred, however other calcium carbonates include, for example, oyster shell, crab shell and others.

In step (a) of the first and second methods, as the whole surface of the calcium carbonate contacts the silver nitrate solution, the calcium carbonate on the surface reacts with the silver nitrite to form silver carbonate, and silver ions remain in the solution:

$$CaCO_3 + 2AgNO_3 \rightarrow Ag_2CO_3 + Ca(NO_3)_2.$$

The silver nitrate solution preferably has a concentration ranging from 0.26 mol/l to 1.00 mol/l.

In the first method, for example, sodium ascorbate or sodium erythorbate is added to the calcium carbonate and the silver ions in solution after the step (a), whereby silver carbonate is reduced to silver, and the calcium carbonate is provided with silver adhered on its surface:

$$Ag_2CO_3 + 2C_6H_8O_6.Na \rightarrow 2Ag + Na_2CO_3 + 2C_6H_8O_6.$$

In the second method, when the silver carbonate and the silver nitrate in the fine pores after step (a) are heated at 160° C.–400° C., silver is deposited by the reaction as shown below:

Silver Carbonate $$Ag_2CO_3 \longrightarrow Ag_2O + CO_3 \quad (758 \text{ mmHg}, 218° \text{ C.})$$

-continued $Ag_2O \longrightarrow 2Ag + 1/2O_2$ (760 mmHg, 160° C. or more)

$AgNO_3 \longrightarrow AgNO_2 + 1/2O_2$ $AgNO_2 \longrightarrow Ag + NO_2$ (760 mmHg, m.p. 212° C.)

The formed nitrogen dioxide is heated, forming:

$NO_2 \rightarrow NO + 1/2O_2$.

Calcium Carbonate $CACO_3 \longrightarrow CaO + CO_2$ (760 mmHg, 898° C.).

In step (a) of the first and second methods, by injecting the silver nitrate solution in the form of an upward stream through the bottom of the calcium carbonate, the air contained in the fine pores of the calcium carbonate can be removed, resulting in uniform contact of the silver nitrate with the calcium carbonate.

DESCRIPTION OF THE PREFERRED EMBODIMENTS

This invention is further illustrated by preferred embodiments. Examples 1 to 8 relate to the first method

EXAMPLE 1

In 500 ml of a 0.589 mol/l silver nitrate solution, 500 g of coral sand was dipped for 3 days with proper stirring.

After the dipped coral sand is dewatered, this coral sand was dipped in a 10 wt. % sodium ascorbate solution for 30 minutes, whereby silver carbonate was reduced to silver which adhered to the surface of the coral sand.

After dipping, the resulting coral sand was dewatered and washed with flowing water on a sieve for about 5 minutes, and then dewatered again.

Firing at 350° C. for 2.5 hrs in a muffle furnace was conducted after dewatering, whereby provision of a purifying agent including silver was completed.

The reason for firing at 350° C. for about 2 hours is that residual silver carbonate is reduced to silver by this heating when the reduction by sodium ascorbate is incomplete.

EXAMPLE 2

Using a 10 wt. % sodium erythorbate solution instead of the 10 wt. % sodium ascorbate used in Example 1, a purifying agent including silver was prepared according to the same method as in Example 1.

CONFIRMATION TEST 1

In the addition of silver by the method shown in Examples and 2, the following amounts of silver would adhere to the coral sand if it is assumed that all the silver in the silver nitrate theoretically adheres to the coral sand, which is assumed to consist of 100% calcium carbonate:

0.589 mol/l × 0.5 l × 107.9 g/mol = 31.8 g.

However, since some silver is washed out in the processes of dipping and washing, and some silver compounds do not react, in fact, the amount of silver provided is lower than the theoretical value.

Then, the amount of silver adhered to the coral sand was confirmed by the following method and the results shown in Table 1 were obtained.

TEST METHOD

After being finely pulverized, 1 g of a sample is placed in a nitric acid solution and dissolved therein by heating. The solution is filtered and sufficient purified water is added to the filtered solution to obtain a 100 ml sample. The amount of silver in the sample is then measured by atomic absorption analysis.

TABLE 1

| Sample Reducing agent | Impregnation amount of silver Amount of silver (unit: wt. %) | |
|---|---|---|
| | Theoretical value | Measured value |
| Sodium ascorbate | 11.9 wt. % | 2.21 wt. % |
| Sodium erythorbate | 11.9 wt. % | 2.08 wt. % |

EXAMPLE 3

In 500 ml of a silver nitrite solution (0.589 mol/l), 500 g of coral sand was dipped for three days. The material was dewatered and was dipped in a sodium ascorbate solution (10 wt. %) for 1 hour and silver carbonate was reduced to silver, whereby silver was adhered to the coral sand.

EXAMPLE 4

In 500 ml of a silver nitrite solution (0.981 mol/l), 500 g of coral sand was dipped for three days. The material was dewatered and was dipped in a sodium ascorbate solution (20 wt. %) for 1 hour and silver carbonate was reduced to silver, whereby silver was adhered to the coral sand.

EXAMPLE 5

In 500 ml of a silver nitrite solution (0.523 mol/l), 500 g of coral sand was dipped for three days. The material was dewatered and was dipped in a sodium ascorbate solution (10 wt. %) for 1 hour and the silver carbonate was reduced to silver, whereby silver was adhered to the coral sand.

EXAMPLE 6

In 500 ml of a silver nitrite solution (0.851 mol/l), 500 g of coral sand was dipped for three days. The material was dewatered and was dipped in a sodium ascorbate solution (10 wt. %) for 1 hour and the silver carbonate was reduced to silver, whereby silver was adhered to the coral sand.

EXAMPLE 7

In 500 ml of a silver nitrite solution (0.589 mol/l), 500 g of coral sand was dipped for three days. The material was dewatered followed by washing with tap water three times, was dipped in a sodium ascorbate solution (10 wt. %) for 1 hour and the silver carbonate was reduced to silver, whereby silver was adhered to the coral sand.

EXAMPLE 8

In 500 ml of silver nitrite solution (0.981 mol/l), 500 g of coral sand was dipped for three days. The material was dewatered and washed with tap water three times, was dipped in a sodium ascorbate solution (20 wt. %) for 1 hour and the silver carbonate was reduced to silver, whereby silver was adhered to the coral sand.

CONFIRMATION TEST

For the coral sands onto which silver was deposited in Examples 3-8, g of the respective samples was finely pulverized, then dipped in a nitric acid solution in the same manner as described above, and further dissolved therein by heating. The solutions were filtered and sufficient purified water was added to the filtered solutions to obtain 100 ml samples. The amount of silver in the samples was measured by atomic spectrum analysis and the results shown in Table 2 were obtained.

TABLE 2

| Evaluation Kind of sample | Amount of Silver | | |
|---|---|---|---|
| | Target value | Theoretical value | Measured value |
| Example 3 | 2.5 wt. % | 11.9 wt. % | 2.70 wt. % |
| Example 4 | 5.0 wt. % | 19.0 wt. % | 5.59 wt. % |
| Example 5 | 2.5 wt. % | 10.6 wt. % | 2.99 wt. % |
| Example 6 | 5.0 wt. % | 16.7 wt. % | 6.00 wt. % |
| Example 7 | 2.5 wt. % | 11.9 wt. % | 2.86 wt. % |
| Example 8 | 5.0 wt. % | 19.0 wt. % | 4.97 wt. % |

Examples 9-11 illustrate the second method in detail.

EXAMPLE 9

In 10 ml of a 0.589 mol/l silver nitrate solution, 10 g of a coral sand which had been washed with water and desalted was placed into a warm bath at 50°-70° C. for 20 hours.

After the coral sand was dewatered, this coral sand was heated to 250° C. in a nitrogen current, whereby silver carbonate was reduced to silver and adhered to the surface of the coral sand.

EXAMPLE 10

In 10 ml of a 0.589 mol/l silver nitrate solution, 10 g of a coral sand which had been washed with water and desalted was placed into a warm bath at 50°-70° C. for 10 hours.

After the coral sand was dewatered, the coral sand was heated to 200° C. in a nitrogen current, whereby silver carbonate was reduced to silver and adhered to the surface of the coral sand.

CONFIRMATION TEST

When silver is added by the method of Examples 9 and 10, the following amounts of silver would adhere if it is assumed that all the silver in the silver nitrate theoretically adheres to the coral sand which is assumed to consist of 100% of calcium carbonate:

$$0.589 \text{ mol/l} \times 0.01 \text{ l} \times 107.9 \text{ g/l} = 0.635 \text{ g}.$$

However, since some silver is washed out in the processes of dipping and washing, and some silver compounds do not react, in fact, the amount of silver provided is lower than the theoretical value.

Then, the amount of silver adhered to the coral sand was confirmed by the following method and the results shown in Table 3 were obtained.

TEST METHOD

After being finely pulverized, 1 g of a sample is placed in a nitric acid solution and dissolved therein by heating. The solution is filtered and sufficient purified water is added to the filtered solution to obtain a 100 ml sample. The amount of silver in the sample is then measured by atomic absorption analysis.

TABLE 3

| Impregnation amount of silver (Theoretical value: 6.14 wt. %) | | |
|---|---|---|
| Example | Dipping time in silver nitrate | |
| Evaluation | Example 1 (10 hrs) | Example 2 (20 hrs) |
| Impregnation amount of silver | 2.33 wt. % | 2.12 wt. % |

TABLE 4

| Sample | Amount of coral sand (g) | Silver nitrate soln. | | Warm bath temp. °C. | Time hr | Firing temp. °C. | Time hr | Addn. amount of Ag wt. % | |
|---|---|---|---|---|---|---|---|---|---|
| | | Conc. M | Amount l | | | | | Theoretical | Practical |
| 1 | 10.0023 | 1.000 | 0.100 | 70 | 20 | 150 | 1 | — | 18.53 |
| 2 | 10.0023 | 0.960 | 0.100 | 70 | 10 | 400 | 1 | 66.6 | 31.71 |
| 3 | 10.0031 | 0.960 | 0.100 | 70 | 20 | 150 | 1 | — | 51.15 |
| 4 | 10.0342 | 0.956 | 0.100 | 70 | 20 | 150 | 1 | — | 23.49 |
| 5 | 10.0391 | 0.478 | 0.100 | 70 | 20 | 150 | 1 | — | 35.23 |
| 6 | 10.0388 | 1.010 | 0.100 | 70 | 10 | 150 | 1 | — | 30.47 |
| 7 | 10.0240 | 0.101 | 0.100 | 70 | 10 | 250 | 1 | 10.3 | 8.62 |
| 8 | 10.0228 | 0.0101 | 0.100 | 70 | 10 | 250 | 1 | 1.07 | 0.306 |
| 9 | 10.0152 | 0.0101 | 0.100 | 70 | 20 | 250 | 1 | 1.07 | 0.676 |
| 10 | 10.0238 | 0.103 | 0.100 | 70 | 20 | 250 | 1 | 9.54 | 8.82 |
| 11 | 9.9971 | 0.0513 | 0.100 | 70 | 10 | — | — | — | 3.78 |
| 12 | 10.2132 | 0.0513 | 0.100 | 70 | 20 | — | — | — | 6.08 |

EXAMPLE 11

After an approximately fixed amount of coral sand was dipped in silver nitrate solutions (100 ml) having various concentrations for 10 hours or 20 hours, and then heated and reduced at various temperatures in air for 1 hour, the amount of silver provided on coral sand was examined as shown in Table 4. The amount of silver deposited was determined by atomic absorption analysis in the same manner as described above.

The analyses of the compounds provided on the coral sand showed that it is a silver carbonate (yellow) that adheres in samples 1, 3, 4, 5, 6, 11, 12 and silver oxide and silver (dark brown or white) that adhere to samples 2; 7, 8, 9, 10.

In particular, it was shown that when heated at 400° C., all the silver carbonate was reduced to silver.

The content of silver carbonate, silver oxide or silver at various temperatures, starting with silver carbonate ($Ag_2CO_3$), was examined, and the results shown in Table 5 were obtained.

TABLE 5

| Content Temperature | Content (wt. %) | | |
|---|---|---|---|
| | Ag$_2$CO$_3$ | Ag$_2$O | Ag |
| At the time of formation | 100 wt. % | 0 wt. % | 0 wt. % |
| 110° C. | 83 wt. % | 17 wt. % | 0 wt. % |
| 150° C. | 47 wt. % | 53 wt. % | 0 wt. % |
| 250° C. | 33 wt. % | 67 wt. % (inclusion) | |
| 400° C. | 0 wt. % | 0 wt. % | 100 wt. % |

I claim:

1. A method of providing silver on a calcium carbonate material having fine pores, the method comprising, in the order recited, the steps of:
   (a) contacting a calcium carbonate material with an aqueous solution of silver nitrate for a time effective for the silver nitrate to react with the calcium carbonate to form silver carbonate on the surface of the calcium carbonate material;
   (b) dewatering the calcium carbonate material; and
   (c) treating the calcium carbonate material in an aqueous solution containing from 5 to 15 weight % of a reducing agent selected from the group consisting of ascorbic acid, a derivative of ascorbic acid, erythrobic acid, and a derivative of erythrobic acid to reduce the silver carbonate on the surface of the calcium carbonate to silver.

2. The method according to claim 1, wherein step (a) includes stirring the calcium carbonate material in the aqueous solution of silver nitrate and shielding the calcium carbonate material from light for from about 1 to about 5 days.

3. The method according to claim 1, wherein the aqueous solution of silver nitrate has a concentration ranging from 0.26 mole/liter to 1.00 mole/liter.

4. The method according to claim 1, wherein the reducing agent is selected from the group consisting of sodium ascorbate and sodium erythrobate.

5. The method according to claim 1, further comprising dewatering the calcium carbonate material after step (c) and heating at a temperature ranging from 300° C. to 400° C. to reduce substantially all silver carbonate to silver.

6. The method according to claim 1, wherein the calcium carbonate material is selected from the group consisting of coral sand, oyster shells, and crab shells.

7. A method of providing silver on a calcium carbonate material having fine pores, the method comprising, in the order recited, the steps of:
   (a) injecting an upward stream of an aqueous solution of silver nitrate through a layer of calcium carbonate material to remove air from the pores of the calcium carbonate material and for a time effective for the silver nitrate to react with the calcium carbonate thereof and form silver carbonate on the surface of the calcium carbonate material;
   (b) dewatering the calcium carbonate material; and
   (c) treating the calcium carbonate material in an aqueous solution containing from 5 to 15 weight % of a reducing agent selected from the group consisting of ascorbic acid, a derivative of ascorbic acid, erythrobic acid, and a derivative of erythrobic acid to reduce the silver carbonate on the surface of the calcium carbonate to silver.

8. The method according to claim 7, wherein step (a) includes injecting the layer of calcium carbonate material with the upward stream of an aqueous solution of silver nitrate and shielding the calcium carbonate material from light for from about 1 to about 5 days.

9. The method according to claim 7, wherein the aqueous solution of silver nitrate has a concentration ranging from 0.26 mole/liter to 1.00 mole/liter.

10. The method according to claim 7, wherein the reducing agent is selected from the group consisting of sodium ascorbate and sodium erythrobate.

11. The method according to claim 7, further comprising dewatering the calcium carbonate material after step (c) and heating at a temperature ranging from 300° C. to 400° C. to reduce substantially all silver carbonate to silver.

12. The method according to claim 7, wherein the calcium carbonate material is selected from the group consisting of coral sand, oyster shells, and crab shells.

13. A method of providing silver on a calcium carbonate material having fine pores, the method comprising, in the order recited, the steps of:
   (a) contacting a calcium carbonate material with an aqueous solution of silver nitrate for a time effective for the silver nitrate to react with the calcium carbonate to form silver carbonate on the surface of the calcium carbonate material;
   (b) dewatering the calcium carbonate material; and
   (c) uniformly heating the calcium carbonate material at a temperature of at least 200° C. in an atmosphere selected from the group consisting of a current of air and a current of nitrogen to reduce the silver carbonate on the surface thereof to silver.

14. The method according to claim 13, wherein step (a) includes stirring the calcium carbonate material in the aqueous solution of silver nitrate and shielding the calcium carbonate material from light for from about 1 to about 5 days.

15. The method according to claim 13, wherein uniform heating in step (c) is at a temperature ranging from 300° to 400° C.

16. The method according to claim 13, wherein the aqueous solution of silver nitrate has a concentration ranging from 0.26 mole/liter to 1.00 mole/liter.

17. The method according to claim 13, wherein the reducing agent is selected from the group consisting of sodium ascorbate and sodium erythrobate.

18. The method according to claim 13, wherein the calcium carbonate material is selected from the group consisting of coral sand, oyster shells, and crab shells.

19. A method of providing silver on a calcium carbonate material having fine pores, the method comprising, in the order recited, the steps of:
   (a) injecting an upward stream of an aqueous solution of silver nitrate through a layer of calcium carbonate material to remove air from the pores of the calcium carbonate material and for a time effective for the silver nitrate to react with the calcium carbonate and form silver carbonate on the surface of the calcium carbonate material;
   (b) dewatering the calcium carbonate material; and
   (c) uniformly heating the calcium carbonate material at a temperature of at least 200° C. in an atmosphere selected from the group consisting of a current of air and a current of nitrogen to reduce the silver carbonate on the surface of the calcium carbonate to silver.

20. The method according to claim 19, wherein step (a) includes injecting the layer of calcium carbonate material with the upward stream of an aqueous solution of silver nitrate and shielding the calcium carbonate material from light for from about 1 to about 5 days.

21. The method according to claim 19, wherein uniform heating in step (c) is at a temperature ranging from 300° to 400° C.

22. The method according to claim 19, wherein the aqueous solution of silver nitrate has a concentration ranging from 0.26 mole/liter to 1.00 mole/liter.

23. The method according to claim 19, wherein the reducing agent is selected from the group consisting of sodium ascorbate and sodium erythrobate.

24. The method according to claim 19, wherein the calcium carbonate material is selected from the group consisting of coral sand, oyster shells, and crab shells.

* * * * *